United States Patent
Kuhnert et al.

[11] Patent Number: 5,554,908
[45] Date of Patent: Sep. 10, 1996

[54] PRECOMBUSTION CHAMBER DEVICE

[76] Inventors: Dieter Kuhnert, Friedrich-Metz-Strasse 18; Reinhard Latsch, Sunnisheimring 43, both of 74889 Sinsheim, Germany

[21] Appl. No.: 411,896

[22] Filed: Mar. 28, 1995

[30] Foreign Application Priority Data

Mar. 29, 1994 [DE] Germany ............ 44 10 858.3

[51] Int. Cl.$^6$ .................. H01T 13/20; F02B 19/00
[52] U.S. Cl. .............. 313/140; 313/141; 313/139; 313/142; 313/143; 123/260
[58] Field of Search ................... 313/141, 140, 313/139, 142, 143, 144; 123/260, 263, 266

[56] References Cited

U.S. PATENT DOCUMENTS

| | | | |
|---|---|---|---|
| 2,269,682 | 1/1942 | Paulson | 313/142 |
| 4,930,473 | 6/1990 | Dietrich | 313/143 |

*Primary Examiner*—Sandra L. O'Shea
*Assistant Examiner*—John Ning

*Attorney, Agent, or Firm*—Browdy and Neimark

[57] ABSTRACT

A precombustion chamber ignition device for preferably lean fuel-air mixtures and having a precombustion chamber. This precombustion chamber contains a electrode carrier extending into the precombustion chamber and on it at least one ignition electrode is attached, which has at least one ignition portion, which cooperates with a internal wall surface of the precombustion chamber in defining at least one spark gap extending substantially athwart the longitudinal axis of the precombustion chamber. In this respect the internal wall surface acts as a ground electrode. The ignition portion of the at least one ignition electrode is offset in relation to the longitudinal axis of the precombustion chamber and is arranged essentially parallel to the wall surface, which is substantially cylindrical in the spark gap portion, of the precombustion chamber close to the wall surface. In consequence it is possible for the ignition potential to be reduced and in the case of long term operation for the working life of the precombustion chamber ignition device to be increased. More particularly however the reliability of flaming is a substantially improved in the case of diluted fuel-air mixtures (lean mixtures, recycled exhaust gas).

17 Claims, 2 Drawing Sheets

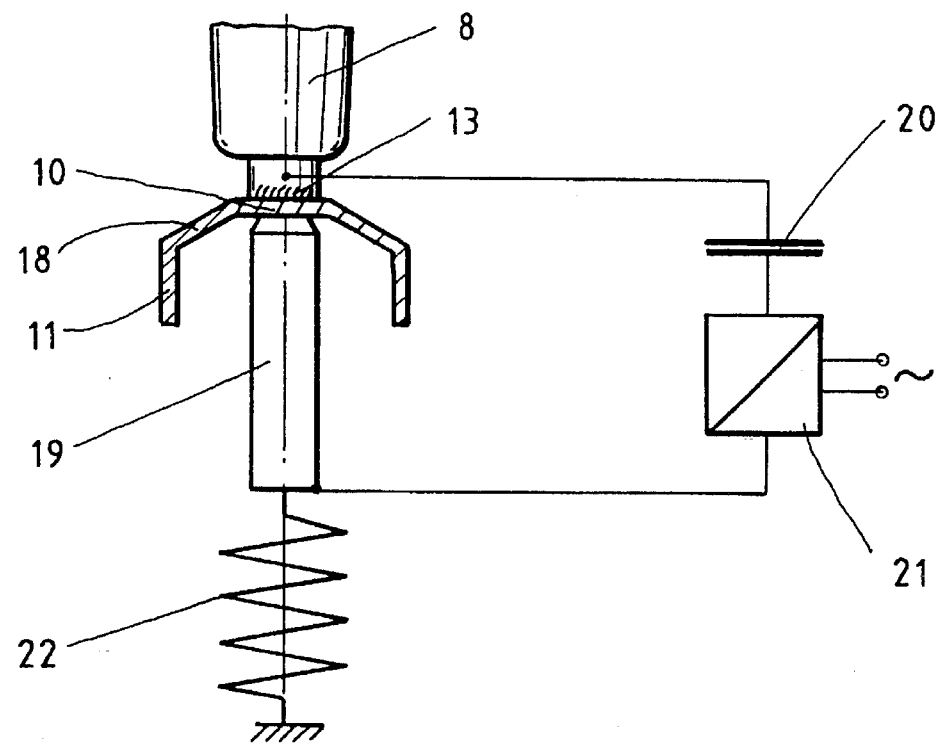
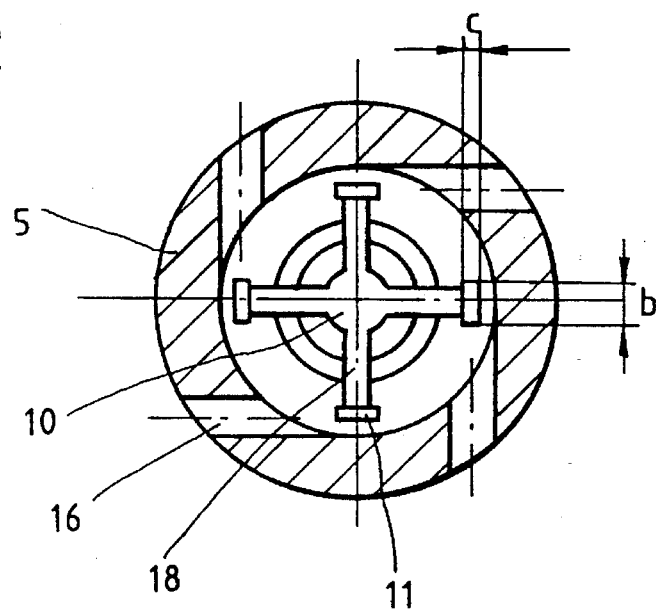

5,554,908

PRECOMBUSTION CHAMBER DEVICE

BACKGROUND OF THE INVENTION

The invention relates to a precombustion chamber device for the ignition of preferably lean fuel-air mixtures comprising a precombustion chamber, which contains an electrode carrier extending into the precombustion chamber and having at least one ignition electrode attached to it, said electrode having at least one ignition portion, which with an inner wall surface of the precombustion chamber defines a spark gap directed substantially athwart the longitudinal axis of the precombustion chamber, such inner wall surface functioning as a ground electrode.

THE PRIOR ART

Ignition devices of this type possess the advantage of having only modest requirements as regards energy and voltage for the production of an effective spark and accordingly have a substantially longer working life.

In the German patent publication 2,916,285 C there is a description of such an ignition device. The embodiment illustrated in the specification possesses several connection ducts between the precombustion chamber and the main chamber, which open predominantly tangentially into the precombustion chamber and consequently produce a flow with a spin. The illustrated embodiments furthermore only have a single spark gap.

The disadvantage of such arrangements is that a spark gap is only formed at one point in the precombustion chamber. Accordingly when there are time-related variations in the state (composition, temperature and flow velocity) of the fuel-air mixture adjacent to the spark gap, as for example owing to a non-homogeneous mixture being supplied to the main combustion chamber or owing to non-homogeneous mixing in of burnt residual gases from the preceding working cycle, there is the possibility of there not being an optimum mixture state for reliable ignition at the point where spark is produced.

Furthermore in the arrangement of such patent specification there is only a limited length of life of the precombustion chamber ignition device, since more particularly owing to erosive wear of the electrode the voltage required will very quickly rise to a level which may no longer be met by the ignition system.

In order to overcome such disadvantages there has been a proposal in the German patent publication 3,821,688 C to have a thin electrode with such a front end bent to be approximately parallel to a wire set in an electrode carrier. Although with the circular cross section wires employed there is a greater reliability as regards flaming of the fuel-air mixture arriving via several transfer ducts from the main combustion space, in the long run however there will be an increase in the electrode spacing owing to burnoff and accordingly an increase in the necessary ignition potential not able to be met by the ignition system.

In a further German patent publication (4,011 630 C) there has been a proposal to improve reliability of flaming and the working life by using several pin-like ignition electrodes in a precombustion chamber spark plug which define spark gaps at several points along the periphery of the front part of the precombustion chamber.

While such an arrangement does possess the advantage that owing to use of several spark gap there is an increase in the reliability of flaming more particularly if in conjunction with a turbulent flow, as suggested, there is a detachment of the spark, there then being a jumping of the spark to another spark gap or even to several other spark gaps something which as a matter of experience leads to an improved probability of flaming. Generally however the precombustion chamber portion is not sufficiently large for jumping of the spark and therefore the reliability of flaming for ignition is generally unsatisfactory.

Furthermore the length of life of such an arrangement is still very limited and is unable to fulfill the every increasing requirements, more especially in the case of modern engines, as regards meeting strict exhaust gas laws to be complied with a constant performance over long periods of time and without any substantial increase in the ignition voltage required.

For a case in which the voltage requirement itself is low and its increase during a long period of use may be kept low, there will furthermore be a potential for saving as regards the performance of the ignition system (for example as regards the ignition coil and insulation of the ignition leads).

SHORT SUMMARY OF THE INVENTION

One object of the invention is to provide such an improvement on known ignition electrodes arrangement that on the one hand the ignition voltage required, more particularly in the case of operation of lean fuel-air mixtures, may be reduced and by making small changes in the electrode set the length of life of the precombustion chamber ignition device may be further increased for long term operation.

In accordance with a further object of the invention the expense or complexity of the ignition system (production of ignition power, insulation) is to be reduced.

More particularly however the reliability of flaming is to be substantially improved in the case of diluted fuel-air mixtures (lean mixtures, recycling of exhaust gas).

In order to achieve these and/or other objects appearing from the present specification, claims and drawings, in the present invention the ignition portion of the at least one ignition electrode is offset in relation to the longitudinal axis of the precombustion chamber and extending substantially parallel to the wall surface, which in the spark gap portion is substantially cylindrical, of the precombustion chamber, is arranged adjacent to the wall surface.

Further developments of the invention are described in the claims.

It is an advantage if several more particularly rectangular ignition electrodes are attached to a central electrode carrier, which in the front portion of the precombustion chamber are arranged substantially parallel to the principal axis and parallel to the outer wall surface of the precombustion chamber where they constitute several spark gap portions.

By having a relatively long form of the ignition electrodes parallel to the front portion of the precombustion chamber there will be a generally large surface area for the spark to jump to and furthermore a particularly large area for the erosive wear of the ignition electrodes. The base surface of the spark gap is accordingly still further increased if a rectangular form of electrode is adopted, the major side surface thereof serving as the end of the ignition electrode.

The rectangular form of the ignition electrodes further offers the advantage that sharp edges are produced at the sides facing the precombustion chamber wall surface, such sharp edges involving a Very high electrical field strength and accordingly a particularly low ignition voltage requirement for the electrical ignition of the precombustion chamber mixture.

Further advantages may be produced if a spin flow is produced rotating about the principal axis of the precombustion chamber, for example by having at least one of the connection holes which are present between the precombustion chamber and the main combustion space, open tangentially into the essentially symmetrical precombustion chamber.

In this case there is a particularly satisfactory reliability of flaming, since in the spark gaps, which are present between the individual electrode, arranged parallel to the wall surface, and the precombustion chamber wall surface, at the point in time of starting electrical ignition there is a high probability that there will be a fresh mixture, offering particularly satisfactory conditions for flaming, between the individual electrodes and the precombustion chamber wall surface acting as the ground electrode.

A further advantage of a rotating flow is that the individual electrodes arranged close to the wall surface lower the flow velocity in the part adjacent to the wall surface, something which prohibits drifting of the ignition spark and favors flaming. Furthermore it is possible to assume that owing to the ignition electrodes being at a very high temperature level the mixture will be heated up adjacent to the wall surface and the chemical reaction velocity will be increased, something which still further favors reliability of flaming.

The danger of self-ignition at the hot electrode surfaces is particularly low in the case of the use of catalytically active metals. This is more particularly true for surfaces of metals of the platinum group or alloys thereof.

In order to reduce wear of the inner wall surface serving as a ground electrode, of the precombustion chamber as far as possible and to simultaneously ensure reliable removal of heat from the front portion, exposed to the main combustion space, such portion is preferably manufactured of nickel or a nickel-containing alloy. Finally there are then particularly cheap possibilities as regards the production of the ignition electrodes arranged in the interior of precombustion chamber, if same are produced of a flat base material as stamped and bent component. In addition attachment on the electrode carrier, arranged substantially centrally inside the precombustion chamber, is able to be ensured in a more particularly permanent and economic manner by pulse welding.

Further advantageous developments and convenient forms of the invention will be understood from the following detailed descriptive disclosure of embodiments thereof in conjunction with the accompanying drawings.

LIST OF THE SEVERAL VIEWS OF THE FIGURES

FIG. 2 shows a cross section taken through the front precombustion chamber portion along the section line X—X of FIG. 1 looking toward the basket-like arrangement of the individual electrodes.

Figure 1:
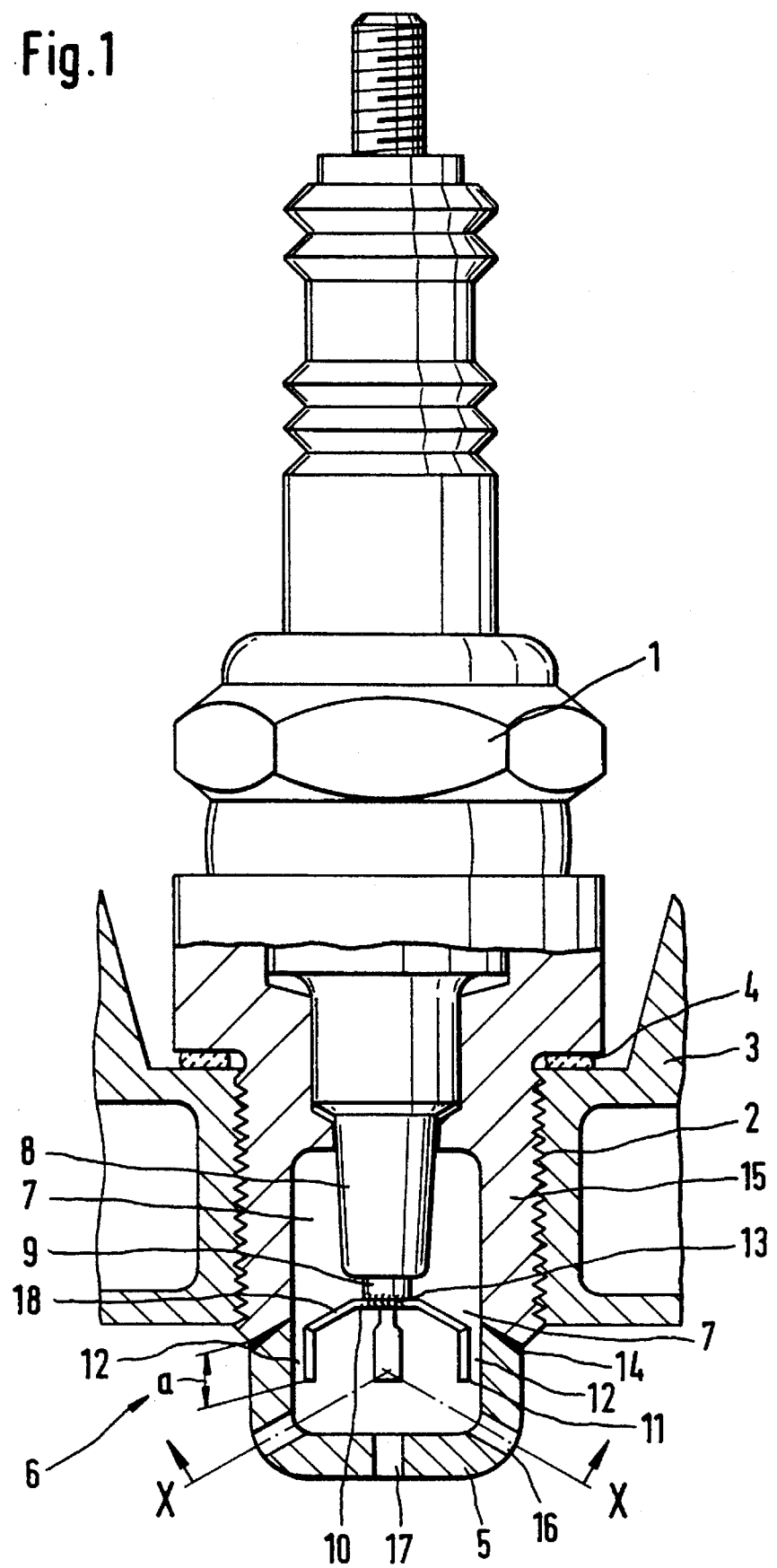
FIG. 1 shows precombustion chamber ignition device in the installed state with a longitudinal section taken through the front portion of the precombustion chamber.

FIG. 3 diagrammatically shows the method of attachment of the central electrode on the electrode carrier using a pulse welding method.

DETAILED ACCOUNT OF WORKING EMBODIMENTS OF THE INVENTION

In FIG. 1 the reader will see the precombustion chamber ignition device having a precombustion chamber 7 and designed in the form of a unit 1 like a spark plug able to be screwed in place, whose female screw thread 2 is screwed into the spark plug hole of the cylinder head of gasoline engine 3 with the use of a washer 4, a portion 5 of the precombustion chamber 7 extending into the combustion space 7 of the gasoline engine.

The precombustion chamber 7, aligned with the principal axis of the unit 1, comprises an insulator in the portion remote from the combustion space 6, such insulator surrounding a central electrode carrier 9. On this electrode carrier 9 a basket-like arrangement of ignition electrodes 10 is mounted, whose four separate arms cooperate with the inner wall surface of the portion 5 of the precombustion chamber 7 (which serves as the ground electrode) in defining a plurality of spark gap zones 12, having the length a and extending in parallelism to the wall surface. For this purpose the ignition electrodes 10 firstly extend obliquely from the electrode carrier 9 toward the inner wall surface of the portion 5, ignition portions 11 extending from the ends of obliquely extending transverse members 18 of the ignition electrodes 10, such ignition portions being cranked or angled and extending in parallelism to the cylindrical portion of such inner wall surface toward the combustion space.

The electrode carrier 9 and the basket-like arrangement of the ignition electrodes 10, which is preferably produced as a stamped and bent component, are connected by a weld 13.

The portion 5, extending into the combustion space 6, of the precombustion chamber 7 is manufactured of nickel, of a nickel alloy or of a material with similar properties and is connected with the remaining portion 15 of the precombustion chamber device by a weld 14. In the case of the use of such materials there is on the one hand a particularly satisfactory removal of heat from the thermally loaded portion 5 of the precombustion chamber 7. On the other hand erosive wear of the wall, serving as the ground electrode, of the front portion of the precombustion chamber is kept extremely low owing to the special properties of the material employed For a particularly rapid and even flaming of the fuel-air mixture in the main combustion space one or more ignition torch jets are employed, which are produced in the precombustion chamber because during the compression stroke of the engine fuel-air mixture introduced in the precombustion chamber is ignited by one or more igniting sparks in the spark gap portion and owing to the powerful explosion during the combustion of the contents of the precombustion chamber are forced outward through holes. For this purpose four external holes 16 are distributed peripherally around a central hole 17 in the flat floor of the portion 5 of the precombustion chamber 7, such holes 16 extending in the transition part between the floor and the cylindrical wall surface of the portion 5 in an obliquely outward direction.

For maximum stability of conditions in the spark gap portions 12 it is important that the axial extent of the separate arms of the ignition electrodes 10 with the length a overlaps the cylindrical wall surface part of the portion 5 to the maximum possible degree.

The spark gap portion 12 having the length a is arranged in the front portion 5 of the precombustion chamber 7, more than half and preferably more than two thirds of the chamber volume being above the transverse members 18.

In FIG. 2 a section is shown extending through the front part of the precombustion chamber at the level of the external holes 16 along the section line X—X in FIG. 1 looking downward toward the basket-like arrangement of the ignition electrodes 10. The section shows the particularly advantageous design with the external holes 16, placed between the combustion space 6 and the precombustion chamber 7 and opening tangentially into the precombustion chamber 7.

Owing to the tangential alignment on entry of the fuel-air mixture a turbulent flow is produced inside the precombustion chamber 7, such flow being substantially directed athwart the elongated individual or separate arms of the ignition electrodes 10. This will ensure that at the time of ignition there is always fresh undiluted fuel-air mixture (which comes in from the combustion space 6) in the elongated spark gap portions 12. The burnt exhaust gas present by itself in the precombustion chamber 7 prior to the start of compression, from the previous combustion cycle is displaced by the entry of fresh gas substantially into the rear portion of the precombustion chamber so that particularly favorable conditions obtain for ignition in the spark gap portions 12.

Such conditions are still further improved because the turbulent flow close to the wall surface is retarded by the separate arms of the ignition electrodes 10 and the spark is not caused to drift. Furthermore owing to the wall surface, which is at a high temperature, of the front portion 5 of the precombustion chamber 7 and of the ignition portions 11 there is a preheating of the fresh fuel-air mixture, something which also favors spark development and simultaneously a rapid propagation of the flame core produced by ignition.

A particularly favorable resistance to wear of the separate arms of the ignition electrodes 10 is achieved because for increasing the wear area the width b of the ignition electrodes 10 having a rectangular cross section is substantially larger in size than the thickness c thereof (see FIG. 2). In this respect the width of the transverse members 18 is somewhat less than the width of the ignition portions 11, something which is however not necessary in each case.

Owing to having a sharp edged design of the ignition portions 11 of the ignition electrodes 10 it is possible to substantially increase the electrical field strength and accordingly to provide for a low breakdown voltage for the sparks.

FIG. 3 diagrammatically represents the method for the attachment of the basket-like arrangement of the ignition electrodes 10 on the electrode carrier 9 by pulse welding. For this purpose the basket-like arrangement of the ignition electrodes 10 is clamped by means of a spring between the electrode carrier 9 and the welding electrode 19. The central electrode carrier 9 and the welding electrode 19 are so electrically connected with a capacitor 20 that the latter may be charged and discharged by a high speed switching unit 21. On discharge an extremely high current will flow through the illustrated arrangement so that between the electrode carrier 9 and the ignition electrodes 10 a very large quantity of heat will be released in the contact zone 13 within a short period of time, which will lead to a reliable weldment 13 being produced between the electrode carrier 9, normally manufactured of nickel or, respectively, of nickel alloy, and the basket-like arrangement of the ignition electrodes 10.

In the above description and the drawings one basket-like array with four ignition electrodes 10 is shown. Naturally this number may also be varied, there however being preferably at least two ignition electrodes Instead of nickel or a nickel based alloy it is also possible to employ a material with similar properties. In this respect it is naturally possible for the entire part of the precombustion chamber 7 to consist of such a material, but in any case at least the precombustion chamber wall surface in the spark gap part 12 should consist thereof.

For the production of the ignition electrode a metal of the platinum group or an alloy thereof is suitable. The ignition electrodes may however consist of a material with a lower price such as tungsten, which is coated with a metal of the platinum group or of a corresponding alloy.

We claim:

1. A precombustion chamber device for the ignition of preferably lean fuel-air mixtures comprising a precombustion chamber, which contains an electrode carrier extending into the precombustion chamber and having at least one ignition electrode attached to it, said electrode having at least one ignition portion, which with an inner wall surface of the precombustion chamber defines a spark gap directed substantially athwart the longitudinal axis of the precombustion chamber, such inner wall surface functioning as a ground electrode, wherein the ignition portion of the at least one ignition electrode is offset in relation to the longitudinal axis of the precombustion chamber and extending substantially parallel to the wall surface, which is in the spark gap portion is substantially cylindrical, of the precombustion chamber is arranged adjacent to the wall surface;

wherein in a fitted condition thereof the precombustion chamber has at least one portion extending into the main combustion space of an internal combustion engine.

2. The device as set forth in claim 1, wherein on the central electrode carrier a basket-like array comprising a plurality of ignition electrodes designed in the form of separate arms is arranged.

3. The device as set forth in claim 2, wherein the separate arms of the ignition electrodes extend from the central electrode carrier in a stellate manner toward the wall surface of the precombustion chamber and where they merge with the ignition portions are cranked.

4. The device as set forth in claim 1, wherein at least one of the ignition portions, extending close to the wall surface, of the ignition electrodes has a length which is in excess of the half the diameter of the substantially circular cross section in the corresponding precombustion chamber portion.

5. The device as set forth in claim 1, wherein the separate arms of the ignition electrodes possess a substantially rectangular cross section, the side facing the wall surface of the precombustion chamber, of an ignition device being wider than the thickness thereof.

6. The device as set forth in claim 1, wherein at least the precombustion chamber wall surface in the spark gap zone or zones consists of nickel or an nickel based alloy.

7. The device as set forth in claim 6, wherein at least the front portion on the combustion chamber side, of the precombustion chamber consists of nickel or nickel based alloy.

8. The device as set forth in claim 1, wherein the precombustion chamber is greater in size in its longitudinal direction than in its transverse direction.

9. The device as set forth in claim 1, wherein the ignition portion of the at least one ignition electrode is arranged substantially in the said portion.

10. The device as set forth in claim 1, wherein the front portion of the precombustion chamber possesses connection holes leading into the main combustion space.

11. The device as set forth in claim 10, wherein one of such connection holes is arranged substantially centrally and parallel to the principal axis of the precombustion chamber ignition device.

12. The device as set forth in claim 10, having at least one radially external connection hole extending substantially tangentially into the precombustion chamber.

13. The device as set forth in claim 2, wherein a basket-like array of the ignition electrodes is designed in the form of a stamped and bent component of thin sheet metal.

14. The device as set forth in claim 2, wherein the basket-like array of the ignition electrodes is connected with the centrally arranged electrode carrier by an pulse weld.

15. The device as set forth in claim 1, wherein the at least one ignition electrode consists of a metal of the platinum group or an alloy of such a metal.

16. The device as set forth in claim 1, wherein the at least one ignition consists essentially of a low-cost electrode material, which is coated with a metal of the platinum group or an alloy of such a metal.

17. The device as set forth in claim 16, wherein tungsten or an alloy essentially consisting thereof is utilized as an electrode material, which is coated with a metal of the platinum group or of an alloy of the same.

* * * * *